US011668015B2

(12) United States Patent
Ben Salah et al.

(10) Patent No.: US 11,668,015 B2
(45) Date of Patent: Jun. 6, 2023

(54) MAGNESIUM-BASED ALLOY AND USE OF SAME IN THE PRODUCTION OF ELECTRODES AND THE ELECTROCHEMICAL SYNTHESIS OF STRUVITE (71) Applicant: E2METRIX INC., Sherbrooke (CA)

(72) Inventors: Ihsen Ben Salah, Sherbrooke (CA); Mohamed Laaroussi, Sherbrooke (CA)

(73) Assignee: E2METRIX INC., Sherbrooke (CA)

( * ) Notice: Subject to any disclaimer, the term of this patent is extended or adjusted under 35 U.S.C. 154(b) by 269 days.

(21) Appl. No.: 16/180,338

(22) Filed: Nov. 5, 2018

(65) Prior Publication Data

US 2019/0071785 A1 Mar. 7, 2019

Related U.S. Application Data (63) Continuation of application No. PCT/CA2017/050537, filed on May 3, 2017.

(51) Int. Cl.
*C25B 11/04* (2021.01)
*C25B 11/02* (2021.01)
(Continued)

(52) U.S. Cl.
CPC ............. *C25B 11/04* (2013.01); *C02F 1/463* (2013.01); *C22C 23/00* (2013.01); *C22C 23/02* (2013.01);
(Continued)

(58) Field of Classification Search
CPC .................. C25B 11/00; C25B 11/04; C25B 11/0405–11/0494; C02F 1/461;
(Continued)

(56) References Cited

U.S. PATENT DOCUMENTS 4,049,532 A * 9/1977 Clerbois ............. C25B 11/0478
204/290.08
6,613,217 B1 * 9/2003 Gilmore ................. C02F 1/463
204/268
2014/0027271 A1 1/2014 Berrak et al.
(Continued)

FOREIGN PATENT DOCUMENTS

CA           2867773          1/2014
CN           103936105        7/2014
WO     WO-2007003003 A1 *    1/2007      ............. C02F 1/463

OTHER PUBLICATIONS

Vasudevan et al. ("Studies on a Mg—Al—Zn Alloy as an Anode for the Removal of Fluoride from Drinking Water in an Electrocoagulation Process", Clean, 37 (4-5), 2009, pp. 372-378) (Year: 2009).*
Polmear (Grades and Alloys, Magnesium and Magnesium Alloys, 1999, pp. 12-25). (Year: 1999).*
(Continued)

*Primary Examiner* — Alexander W Keeling
(74) *Attorney, Agent, or Firm* — Leason Ellis LLP (57) ABSTRACT A novel magnesium-based alloy is described. The alloy is particularly suitable for the construction of electrodes, especially anodes, that can be used for an electrochemical process, such as the synthesis of struvite. The magnesium-based alloy is an AZXY alloy in which A is aluminium and Z is zinc, X represents the content, expressed in wt. %, of the first element, and Y the content, expressed in wt. %, of the second element. The AZXY alloy according to the invention has $2\% \leq X \leq 4\%$ and $0.5\% \leq Y \leq 2\%$, and an iron (Fe) content of less than 0.005%, and preferably less than 0.003%. The anodes constituted by this novel alloy have a much slower corrosion speed and improved performances compared to existing anodes. An electrode cartridge comprising said alloy and suitable for being inserted into an electrolytic
(Continued)

reactor so as to form, once assembled, an electrocoagulation unit, is also described.

13 Claims, 10 Drawing Sheets

(51) Int. Cl.
*C22C 23/02* (2006.01)
*C22C 23/00* (2006.01)
*C02F 1/463* (2023.01)
*C02F 1/461* (2023.01)

(52) U.S. Cl.
CPC .... *C25B 11/02* (2013.01); *C02F 2001/46133* (2013.01); *C02F 2001/46171* (2013.01)

(58) Field of Classification Search
CPC .................. C02F 1/463; C02F 1/46104; C02F 1/46109; C02F 2001/46133; C02F 2001/46138; C02F 2001/46142; C22C 23/00; C22C 23/02
See application file for complete search history.

(56) References Cited

U.S. PATENT DOCUMENTS

| 2015/0080998 A1* | 3/2015 | Mueller | A61F 2/82 623/1.1 |
| 2015/0246830 A1* | 9/2015 | Lalli | C02F 1/463 204/230.3 |

OTHER PUBLICATIONS

Guo ("A Review of Magnesium/Magnesium Alloys Corrosion and its Protection" Recent Patents on Corrosion Science, 2010, 2, pp. 13-21) (Year: 2010).*

Mazraeshahi et al. ("Effect of Si on the creep properties of AZ61 cast magnesium alloy", Materials and Design, 76, 2015, pp. 64-70). (Year: 2015).*

Aircraft Materials: Magnesium Alloy AZ31B: Technical Datasheet [on line], Feb. 23, 2015, [extracted on Aug. 23, 2017], https://www.aircraftmaerials.com/data/magnesium/az31b.html.

Alam et al, "Development and characterization of new AZ41 and AZ51 magnesium alloys", 2011 TMS Annual Meeting, Magnesium Technology: 2011, pp. 553-558.

International Search Report dated Aug. 23, 2017, International application No. PCT/CA2017/05037.

* cited by examiner

MAGNESIUM-BASED ALLOY AND USE OF SAME IN THE PRODUCTION OF ELECTRODES AND THE ELECTROCHEMICAL SYNTHESIS OF STRUVITE

REFERENCE TO PARENT APPLICATIONS

The present application claims priority of Canadian patent application no. 2,928,823 entitled "Magnesium anodes and their use in the electrochemical synthesis of struvite", filed on May 4, 2016 at the Canadian Intellectual Property Office, the content of which is enclosed herewith by reference.

FIELD OF THE INVENTION

The present invention essentially relates to the field of electrochemistry, and more particularly to a new magnesium-based alloy and new anodes comprising this magnesium alloy and their use in the electrochemical synthesis of struvite.

BACKGROUND OF THE INVENTION

Several patents on the synthesis of struvite, each with its specificity, have been drafted and filed. The synthesis and/or electrosynthesis of struvite requires the presence of magnesium whose concentration should respect a molar ratio between N, P and Mg. There are numerous examples of electrocoagulation device patents with the use of magnesium as anode, such as in international patent applications: WO 2001/019735 (Debillemont) related to a device and method for treating slurry, WO 1995/005347 (Rensman) related to an electrolytic system with series of electrodes, WO 2007/009749 (Egner et al.) related to a reactor and method for producing MAP (Magnesium Ammonium Phosphate).

Struvite production technologies include the following patents and documents: U.S. Pat. No. 4,389,317 (Trentelman et al.) related to a process for the chemical reduction of phosphates in water, international patent application WO 2000/056139 (Graham) concerning a method to prevent the formation of struvite in canned fish. A combined treatment device in two steps: treatment in an anaerobic reactor followed by a second struvite formation step, is already known from international application WO 2009/102142 (Chung).

A reactor allowing producing ammonium-magnesium phosphate and a process for producing ammonium-magnesium phosphate from slurry or exhaust gas containing ammonium and using magnesium, is already known from international application WO 2007/009749 (Egner et al.) cited above. In this document, the reactor used is usual with no mixing. A treatment device using magnesium is already known from international application WO 2001/019735 (Debillemont). The use of magnesium is oriented towards the treatment of slurry, precisely the formation of struvite.

Standard magnesium anodes used for electrocoagulation testing have showed signs of failure characterized by large flaking occurring on the surface of the anode especially when subjected to high current densities. This large flaking first affects the amount of magnesium available for coagulation and of course anode life, making the technology less attractive and economically unsustainable.

In addition, if magnesium is mentioned in all of these prior patent documents, none of these references precisely describes the chemical composition of the anode used. The prior art in question only indicates a magnesium-based material. However, according to the expertise developed by the Applicant, it turns out that the chemical composition of the anode is important and that certain elements involved in said composition must be controlled and dosed appropriately to allow the anode to diffuse properly without degrading with flaking.

OBJECTIVES OF THE INVENTION

In order to address the drawbacks mentioned above, research has focused on the development of an electrode, preferably an anode, with mechanical, chemical, morphological, electrical and catalytic performances necessary for optimal coagulant diffusion. This anode must meet certain requirements of the environment in which it will be used. It must therefore have particular mechanical, electrical and electrochemical performances.

Mechanical and Physical Performance:

The electrode must have sufficient mechanical strength to withstand static and dynamic stresses and have a low roughness in order to allow the microbubbles formed during the electrolysis to rise.

Electrical Performance:

The electrical resistivity of the electrode must be less than 50 $\mu\Omega$/cm, although a resistivity of the order of 300 $\mu\Omega$/cm may be acceptable. The electrode must withstand, without degradation, electrical current densities up to 200 mA/cm$^2$ and must be electrically connected to a power source.

Electrochemical Performance:

The electrode must allow the magnesium to be discharged by applying a direct current and have a uniform magnesium diffusion profile over the entire length of the beam.

In order to achieve these objectives, four main steps have been planned.

Step 1: Characterizing used anodes, determining corresponding standard profile to obtain desired mechanical and electrical properties.

Step 2: Establishing the profile, magnesium discharge rate and effect parameters related to the nature of the effluent.

Step 3: Electrochemically characterizing.

Step 4: Proving the importance of the chemical composition.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

SUMMARY OF THE INVENTION

The above-mentioned objectives of the present invention are met with the aid of a new magnesium-based alloy, particularly suitable for electrode design, in particular anode useful in electrochemical processes.

The invention firstly relates to a magnesium-based alloy for the manufacture of electrodes, the magnesium-based alloy being of the AZXY type with A for aluminum, Z for zinc, X being a content in % of the first element with 2%<X<4%, and Y a % content of the second element with 0.5%<Y<2%; the AZXY alloy additionally comprising an iron content of less than 0.005%, preferentially less than 0.003%; and a balance of magnesium, the % indicated being % by weight.

According to a preferred embodiment of the invention, the alloy further comprises a content of manganese Mn, silicon Si and tin Sn.

According to a preferred embodiment of the invention, the alloy has a composition comprising approximately:
- 3.93% Al;
- 0.91% Zn;
- 0.48% Mn;
- 0.0024% Fe;
- 0.010% Si;
- 0.0002% Sn; and
- the Mg balance of about 94.67%.

The invention also relates to the use of the magnesium alloy as described herein for the manufacture of electrodes, in particular for the manufacture of anodes.

The invention also relates to an electrode, preferably an anode, comprising a magnesium alloy as described herein. Preferably, the electrode is cylindrical, tubular or semi-tubular. Even more preferably, the electrode is an anode forming an anode beam consisting of a plurality of cylindrical anodes, tubular and/or semi-tubular.

According to a preferred embodiment of the invention, the electrode comprises a metal core, preferably the metal core comprises iron.

The invention also relates to the use of at least one electrode as defined herein, in an electrochemical process for synthesizing struvite.

The invention also relates to an electrode cartridge adapted to be inserted into an electrolytic reactor so as to form, once assembled, an electrocoagulation unit, the cartridge comprising:
- a ring configured to attach and close an end of the electrolytic reactor when the cartridge is inserted into said reactor;
- a central electrode of tubular shape operatively connected to the center of the ring;
- at least two electrodes of semi-tubular shape and operatively connected to the ring so as to surround the central electrode thereby defining a gap between the central electrode and the semi-tubular electrodes; and
- a hood configured to attach to the other end of the central electrode and semi-tubular electrodes thereby maintaining the gap between the electrodes;
- and wherein the electrodes comprise the magnesium-based alloy as defined herein.

According to a preferred embodiment of the invention, the cartridge comprises three semi-tubular (or semi-cylindrical) electrodes of identical shape surrounding the central electrode, the three electrodes forming a first layer of semi-tubular electrodes.

According to a preferred embodiment of the invention, the cartridge further comprises three semi-tubular electrodes (or semi-cylindrical) of identical shape, operatively connected to the ring and having a size greater than the electrodes of the first layer so as to form a second electrode layer surrounding the electrodes of the first layer, said ring and said cap being configured to hold all the electrodes in place with a second gap between the first and second electrode layers.

According to a preferred embodiment of the invention, the electrodes of the first layer and/or the second layer are spaced relative to each other so as to form a space between each electrode.

According to a preferred embodiment of the invention, the electrodes are connected to a polarity inversion system in order to reversibly transform the central electrode into anode when the semi-tubular electrodes are converted into cathodes, or cathode when the electrodes semi-tubulars are transformed into anodes. Preferably, the polarity inversion system is automatically controlled by a computer.

According to a preferred embodiment of the invention, a distance between the central electrode and the semi-tubular electrodes is adjustable so as to maintain the gap constant when the electrodes are used and consumed.

As detailed below, the new alloy makes it possible to obtain electrodes, and in particular anodes, having improved mechanical, electrical and electrochemical performances and superior to electrodes or anodes known to date. In particular, the anodes made of this new alloy have a much slower corrosion rate and improved yields compared to existing anodes.

BRIEF DESCRIPTION OF THE DRAWINGS

The above and other aspects, features and advantages of the invention will become more readily apparent from the following description, reference being made to the accompanying drawings in which:

FIG. 2 is a photograph of a magnesium anode after 43 hours of use: before cleaning (FIG. 2A) and after cleaning (FIG. 2B);

FIG. 3 is a photograph of a magnesium anode after 109 hours of use: before cleaning (FIG. 3A) and after cleaning (FIG. 3B);

FIG. 4 is a photo of a magnesium anode after 152 hours of use: before cleaning (FIG. 4A) and after cleaning (FIG. 4B);

FIG. 5 is a photograph of a magnesium anode after 189 hours of use: before cleaning (FIG. 5A) and after cleaning (FIG. 5B) and a closeup of the bottom of the cleaned anode (FIG. 5C);

FIG. 6 is a photograph of a magnesium anode after 277 hours of use: before cleaning (FIG. 6A) and after cleaning (FIG. 6B);

DESCRIPTION OF PREFERENTIAL ELEMENTS

A novel magnesium-based alloy and a new electrode, in particular an anode, made of this alloy will be described hereinafter. Although the invention is described in terms of specific illustrative embodiments, it is to be understood that the embodiments described herein are by way of example only and that the scope of the invention is not intended to be limited thereby.

The % symbol used in this application, and unless otherwise stated, means a percentage by weight of the chemical elements contained in the alloy.

The term "about" used in this application, and unless otherwise stated, means that the value of the indicated data (%, weight, temperature, time, etc.) may vary within a range depending on the margin of error of the method or apparatus that was used to determine the data. A margin of error of 10% (percent) is generally accepted.

The electrodes, cathodes and anodes, according to the present invention, with or without a metallic core, are manufactured by extrusion according to a method of manufacture known to those skilled in the art.

As mentioned above, the standard magnesium anodes used for electrocoagulation tests showed signs of failure represented by large flaking occurring on the surface of the anode especially when these are subjected to high current densities. This large flaking first affects the amount of magnesium available for coagulation and indeed anode life, making the technology less attractive and economically unsustainable. Studies have been conducted with the Centre de Métallurgie du Québec (CMQ) to characterize the sacrificial anodes used in the prior art and to detect the origin of the failure. The chemical analysis of the used regular magnesium anode revealed the presence of the following elements: Al, Zn, Mn, Cu, Fe, Si, Ni, Ca, OT, Mg.

It is known that magnesium can exist in the pure state and in the form of alloy. Different systems of alloys are known on the market and the one involved here is the system magnesium, aluminum, zinc. The alloy is designated by the AZXY nomenclature with A for aluminum and Z for zinc, X represents the % content of the first element and Y the % content of the second element. Thus, AZ31 means that the aluminum content is 3% and zinc 1%.

Zinc (Z) is added because it provides the alloy with good mechanical properties; however, its negative effect on microporosity and hot cove, limits its maximum content to 3% (F. Bazile, "Propriété du magnésium et de ses alliages", Techniques de l'ingénieur, Traité Matériaux métalliques, M450).

The alloy used here is AZ31 but the most used alloy in the industry is AZ91D. For metallurgical reasons, the alloy contains in its composition other elements in definite proportions, to provide it with specific properties and to qualify it for specific applications. Thus, AZ31 has a good resistance with an addition of manganese to improve the resistance to corrosion and allow iron to precipitate and be removed, iron being an harmful element to the resistance. Copper, iron, nickel and cobalt are highly undesirable elements with regard to corrosion. However, copper is sometimes used in small proportions for its electrical and thermal conductivity properties (F. Bazile).

The first anodes used for electrocoagulation testing were anodes with a steel core. The average weight of a magnesium rod was 450 g and 50 g for the steel core. Initially, it was considered that the steel core allowed to conduct the current and to make the anode stiffer. However, in the technical documentation, it turned out that magnesium was much more conductive than steel. To increase the life of the anode, we have considered the opportunity to develop magnesium anodes without steel core. The goal was to evaluate the role of the steel core in the stiffening of the anode, and the safety related to the use of a core-free anode. Thus, in several tests, we have manufactured and tested core-free anodes with the chemical composition of Table 2 below.

The first applications of AZ31 magnesium anodes with steel core in electrocoagulation tests showed signs of failure and passivation at the magnesium anode. Significant flaking was observed on the surface of the anode, especially when the anode is subjected to an applied current density greater than 20 mA/cm$^2$. The consequences of this flaking are obvious and can be summed up as follows:

Loss of magnesium and therefore loss of coagulant;
Reduction of the anode life;
Loss of performance following passivation;
Increased roughness of the anode;
Reduction of the effect of produced microbubbles, therefore reduction of electro-flotation;
Risk of clogging of the bottom of the reactor; and
Reduced system security.

The anodes characterized by the CMQ are anodes with steel core. A new anode and a consumed anode have been selected as part of this service and the results are compared to those of an AZ31B standard. The results reported in Table 1 show that the chemical composition of the tested anodes is close to that of the standard, which suggests that the anodes used are AZ31B, an extruded magnesium alloy. The corrosion product was also analyzed. This is magnesium oxide (gray powder) and a mixture of different oxides (green agglomerate) that probably come from the wastewater treatment process.

The CMQ has characterized the chemistry of magnesium anodes with steel core by optical emission spectrometry and microstructures by optical metallography and scanning electron microscopy. The chemical analysis of the anodes is presented in Table 1 below:

TABLE 1

| Chemical composition (% by weight) of anodes with steel core: | | | | | | | | | | |
|---|---|---|---|---|---|---|---|---|---|---|
|  | Al | Zn | Mn | Cu | Fe | Si | Be | P | Ni | Mg |
| Anode 1 | 2.90 | 1.16 | 0.37 | 0.0013 | 0.0079 | 0.020 | 0.0001 | 0.00054 | 0.0015 | Bal. |
| Anode 2 | 2.77 | 0.87 | 0.36 | 0.028 | 0.0104 | 0.016 | 0.0006 | 0.00029 | 0.0008 | Bal. |
| Anode 3 | 2.94 | 0.87 | 0.37 | 0.034 | 0.0108 | 0.019 | 0.0004 | 0.00027 | 0.0010 | Bal |
| STD AZ31 B | 2.5-3.5 | 0.6-1.4 | 0.2-1.0 | 0.04 max | 0.005 max. | 0.10 max | — | — | 0.005 max | Bal. |

The chemical analyzes of the anodes used by the inventors confirm that they are manufactured from extruded alloy AZ31B for which we find a relatively high iron concentration compared to the standard. It has been determined that iron is the most harmful element to corrosion resistance of magnesium alloys. Iron is also the cause of flaking of the anode. It is therefore this element, the presence of which must be reduced to the maximum in the composition of the anodes according to the invention, and certainly at a concentration less than or equal to the concentration required by the standard, i.e. 0.005% by weight.

Zinc is also present in larger quantities in the anode. It has been determined that this element of the alloy helps counteracting the negative effect of iron on the corrosion resistance present in the alloy. Scanning electron microscope analyses show the formation of more or less extensive and deep cavities where corrosion products tend to accumulate. They result in the presence of dark areas on the micrographs obtained. In addition, the surface area covered by these dark areas increases with an increase in the amount of electricity passing through the electrode. In addition, the light areas consist of small points of metallic luster that correspond to the magnesium itself. These observations suggest that the dissolution is very localized while the roughness of the surface increases with the amount of current that has passed through the anode. The roughness becomes such that it is reasonable to consider that magnesium particles separate completely from the anode to remain captive in the corrosion product. The technical documentation also notes that the corrosion product depends on the species present in the composition of the anode, such as iron when it is in high concentration (F. Bazile, cited above).

In summary, the anode currently used is consumed too quickly. For real-life application, cheese factory wastewater, the anodic beam subjected to a current density higher than 35 mA/cm$^2$, a cathode surface much larger than the anode surface, has shown a lifetime of 100 hours. This anodes lifetime is economically unsustainable. To increase it, the Applicant has identified the origin of this unfortunate mass loss. The main identified parameters that may affect the behavior of the anode and accelerate corrosion are listed below:

Current density;
Cathode Surface/Anodic Surface Ratio;
Chemical composition of the anode;
Parameters related to the nature of the water to be treated.

In light of the first preliminary results, to increase service lifetime of the anode beam, the Applicant has undertaken the following measures:

Developing a specific chemical composition of an anode in which the product of corrosion is reduced, or removed, in the chemical composition, i.e. iron, see Table 2;
Reducing cathode/anode surface ration to a value close to 1;
Reducing the difference of potential between the metals used as cathode and anode, in the ultimate case, using the same material;
Conditioning the effluent at a conductivity that would maintain a current density of about 20 mA/cm$^2$.

The anodes without a core contain a lower concentration of aluminum than iron core anodes (2.41 vs. 3.93%). In both cases, the aluminum concentration is outside the AZ31B standard;
The anodes without an iron core have a lower roughness than the anodes with iron core. However, higher the current density is and more this difference diminishes;
The coreless anodes have a higher corrosion rate for all current densities studied;
For all the experiments carried out, it was noticed that the amount of "sludge" collected in the bottom of the reactor at the end of the tests was all the time more important for the anodes without iron core;
Observations in light and electron microscopy confirm that anodes with an iron core exhibit a more rugged (rougher) corrosion profile;
The type of corrosion observed for both types of anode is widespread corrosion.
Corrosion does not follow a preferential path;
For all experiments, the residue collected in the bottom of the reactor and scraped from the anodes is magnesium oxide.

The difference in the observed corrosion rates is considered to be due to the chemical composition. The extra amount of aluminum would have decreased the rate of corrosion. Very little literature exists on this subject. Indeed, these anodes are generally used without an external power source.

In addition, the iron core could also have an effect on the rate of corrosion.

If the aluminum concentration of the anodes is as large as stipulated here, anodes with a constant chemical composition should be preferentially used to promote predictable behavior.

To optimize the chemical composition of the magnesium anode for the electrocoagulation process, the Applicant has also requested the services of the CMQ. The results of the experiments show that Pure magnesium is to be avoided as a material used in the manufacture of sacrificial anodes;
The anodes according to the invention offer a better resistance to corrosion than AZ31. This is probably due to a higher proportion of aluminum and lower iron contamination than in the latter.

TABLE 2

Anode chemical composition (% by weight) according to a preferred embodiment of the invention:

|  | Al | Zn | Mn | Cu | Fe | Si | Ni | Ca | OT | Mg |
|---|---|---|---|---|---|---|---|---|---|---|
| Anode 1 | 4-5 | 1.16 | 0.2 min | 0.05 max | 0.004 max | 0.30 | 0.005 | 0.30 | 0.30 | Bal. |
| STD AZ31 B | 2.5-3.5 | 0.6-1.4 | 0.2-1.0 | 0.04 max | 0.005 max. | 0.10 max | 0.005 max | — | — | Bal. |

To improve lifetime of magnesium anodes used in the electrocoagulation process, the Applicant has sought to improve and characterize lifetime of two types of sacrificial magnesium anodes.

To do so, electrocoagulation tests at different current densities (20, 50, 100 and 300 mA/cm$^2$) in 0.5% w/v NaCl solution, for two types of magnesium anodes (with and without iron core) were performed. The various tests and the chemical and micrographic characterization have led to the conclusion that:

The lifetime of the anode beam was improved significantly with the new developments, including the chemical composition, the surface ratio close to 1 and the use of near potential materials. However, as stated by Faraday's second law, the amount of mass produced by imposing a current is proportional to the applied current intensity and is intimately related to the pollutant load. Thus, if one wants to ensure an anode lifetime long enough, it is imperative to load the anode. The nine-anode beam has a magnesium mass of 4500 g and a lifetime of 123 hours when subjected to a current intensity of 80 A.

The Applicant has undertaken to change the anode by giving it more mass. Thus, a first cylindrical anode design of 10 kg of magnesium was developed and inserted into a reactor of 6 inches in diameter. Subsequently, for reasons of transport, the cylindrical magnesium anode was abandoned in favor of a set of three semi-cylindrical magnesium anodes of 3 kg each, i.e. a total of 9 kg to be inserted into a reactor of 6 inches in diameter. Ultimately, a new concept where the anode and the cathode are of the same material, that is to say three magnesium semi-cylindrical anodes of 3 kg each surrounded by three magnesium semi-cylindrical cathodes of 5 Kg each for a total of 24 Kg. Concentric electrodes has already been described by the Applicant in the patent application filed in the United States and published under no. US 2014/0027271 A1, the contents of which are hereby incorporated by reference.

However, as indicated above, the present invention also relates to electrode cartridges comprising the novel magnesium-based alloy.

Electrode cartridges 100, 200 adapted for being inserted into an electrolytic reactor 310 are illustrated in FIGS. 7-11. The cartridges form, once assembled, an electrocoagulation unit 300 illustrated in FIG. 12.

Figure 7:
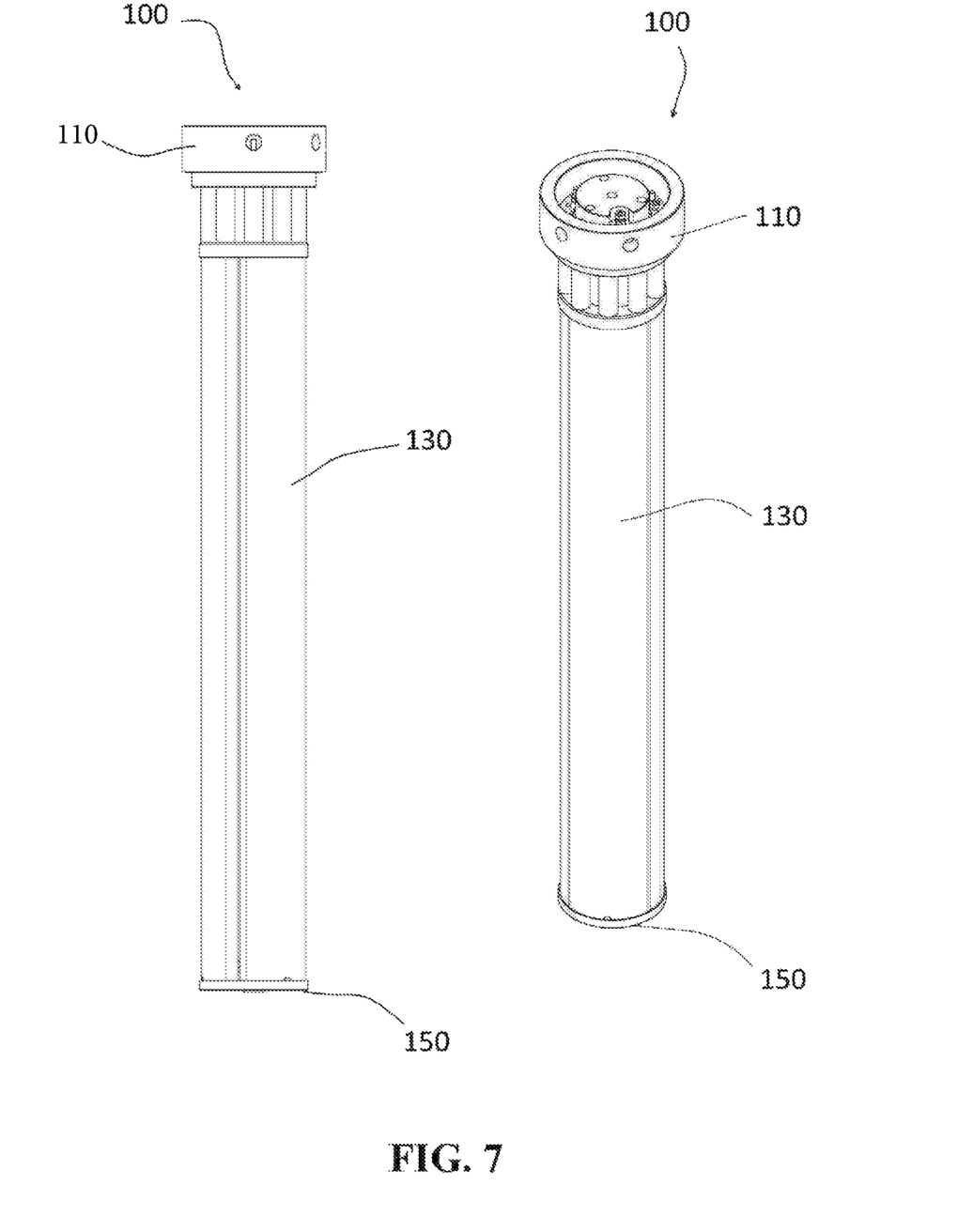
FIG. 7 illustrates a cartridge adapted to fit into an electrolytic reactor to form, once assembled, an electrocoagulation unit according to a preferred embodiment of the invention.

As illustrated in FIG. 7, the cartridge 100 includes a ring 110 configured to attach and close an end of the electrolytic reactor when the cartridge is inserted into said reactor. The cartridge also comprises a central electrode 120 of tubular shape operatively connected to the center of the ring 110; and at least two electrodes, preferably three, of semi-tubular shape 130 and operatively connected to the ring 110 so as to surround the central electrode thus defining a gap 140 between the central electrode 120 and the semi-tubular electrodes 130.

The cartridge further includes a cap 150 configured to attach to the other end of the central electrode and semi-tubular electrodes thereby maintaining the gap 140 between the electrodes.

As mentioned above, the electrodes 130 comprise the magnesium-based alloy as defined herein is object of the present invention.

Figure 8:
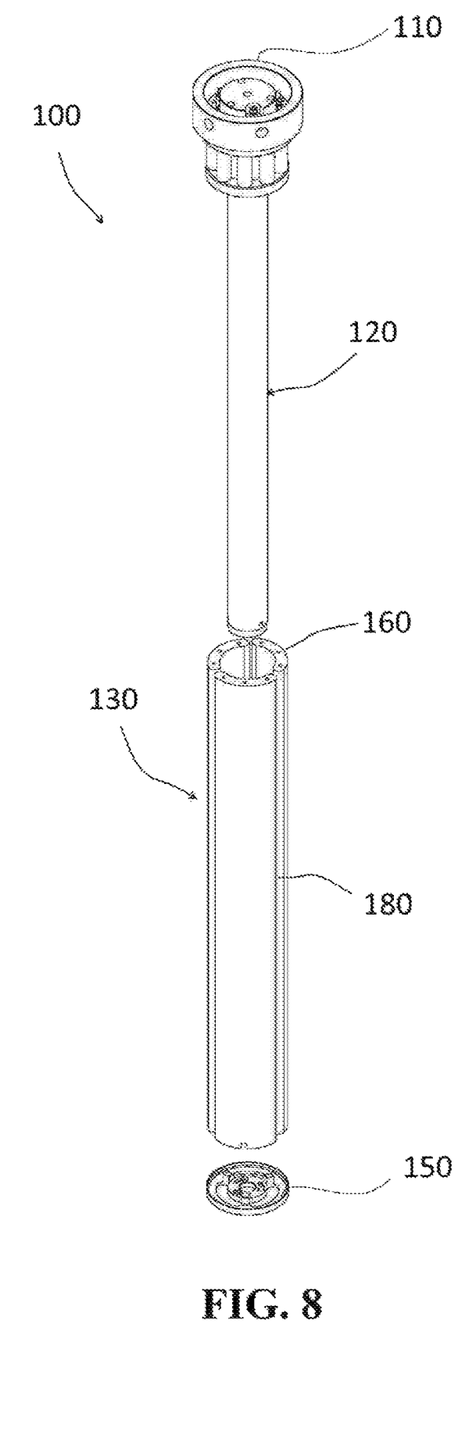
FIG. 8 illustrates an exploded view of a cartridge with a single layer of semi-tubular electrodes according to a preferred embodiment of the invention.
Figure 10:
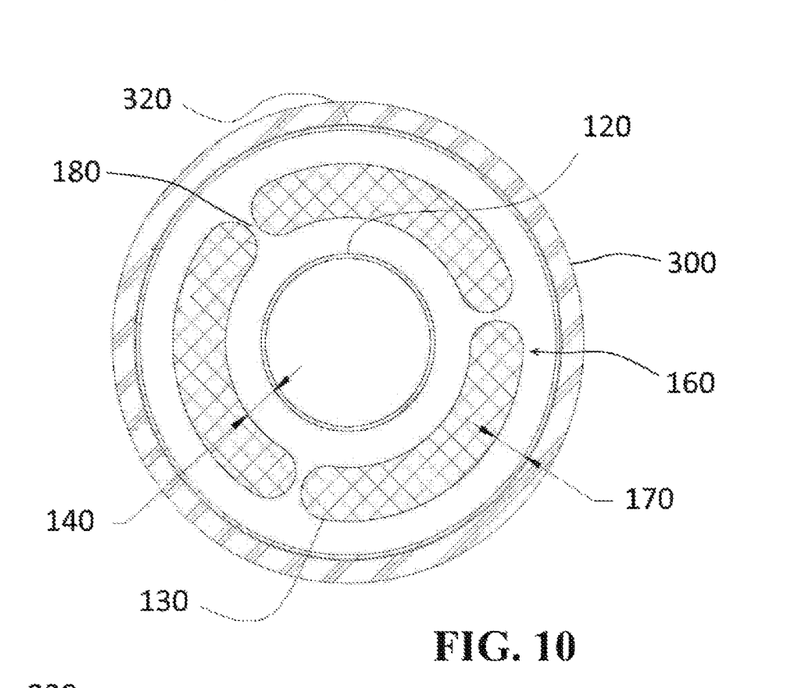
FIG. 10 is a sectional view of a cartridge with a single layer of semi-tubular electrodes according to a preferred embodiment of the invention.

The electrode cartridge 100 illustrated in FIGS. 7, 8 and 10 comprises three semi-tubular electrodes 130 of identical shape surrounding the central electrode 120, the three electrodes forming a first layer of semi-tubular electrodes 160. As illustrated in FIG. 10, the electrode layer 160 forms a gap 140 with the central electrode. Once inserted into the reactor 310, a second gap 170 is formed between the electrode layer 160 and the inner wall of the reactor 320.

Figure 9:
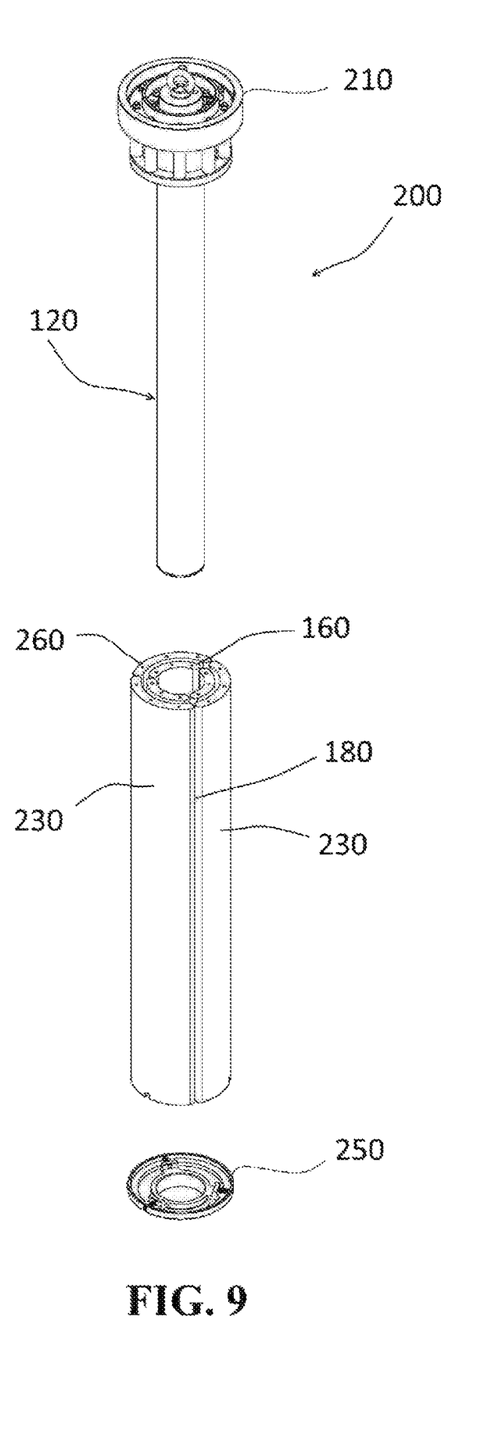
FIG. 9 illustrates an exploded view of a cartridge with two layers of semi-tubular electrodes according to another preferred embodiment of the invention.
Figure 11:
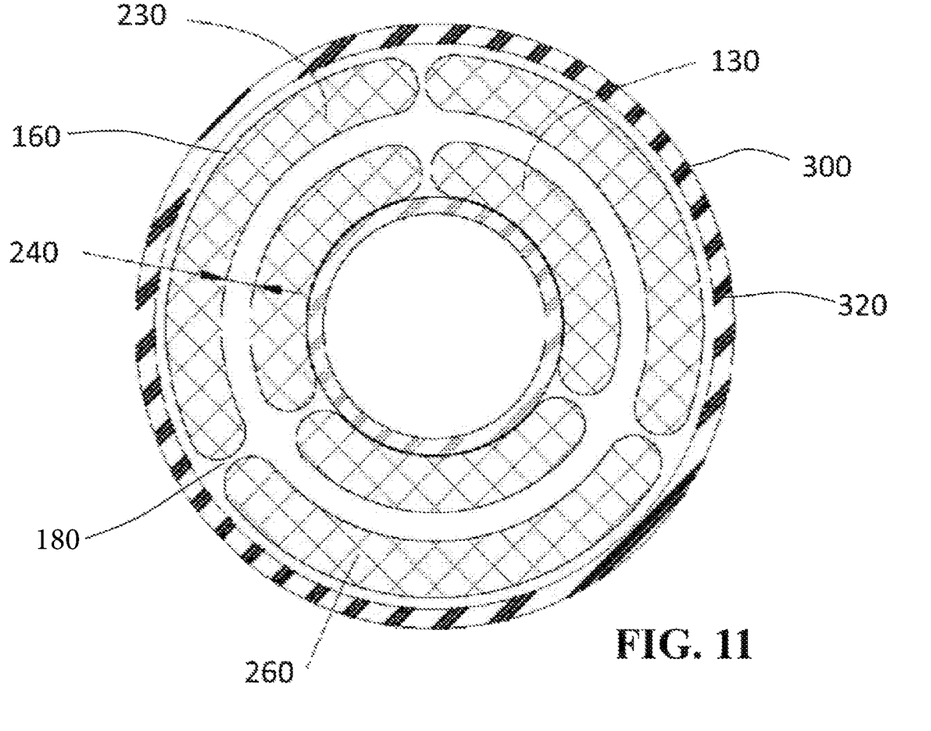
FIG. 11 is a sectional view of a cartridge with two semi-tubular electrode layers according to a preferred embodiment of the invention.
Figure 12:
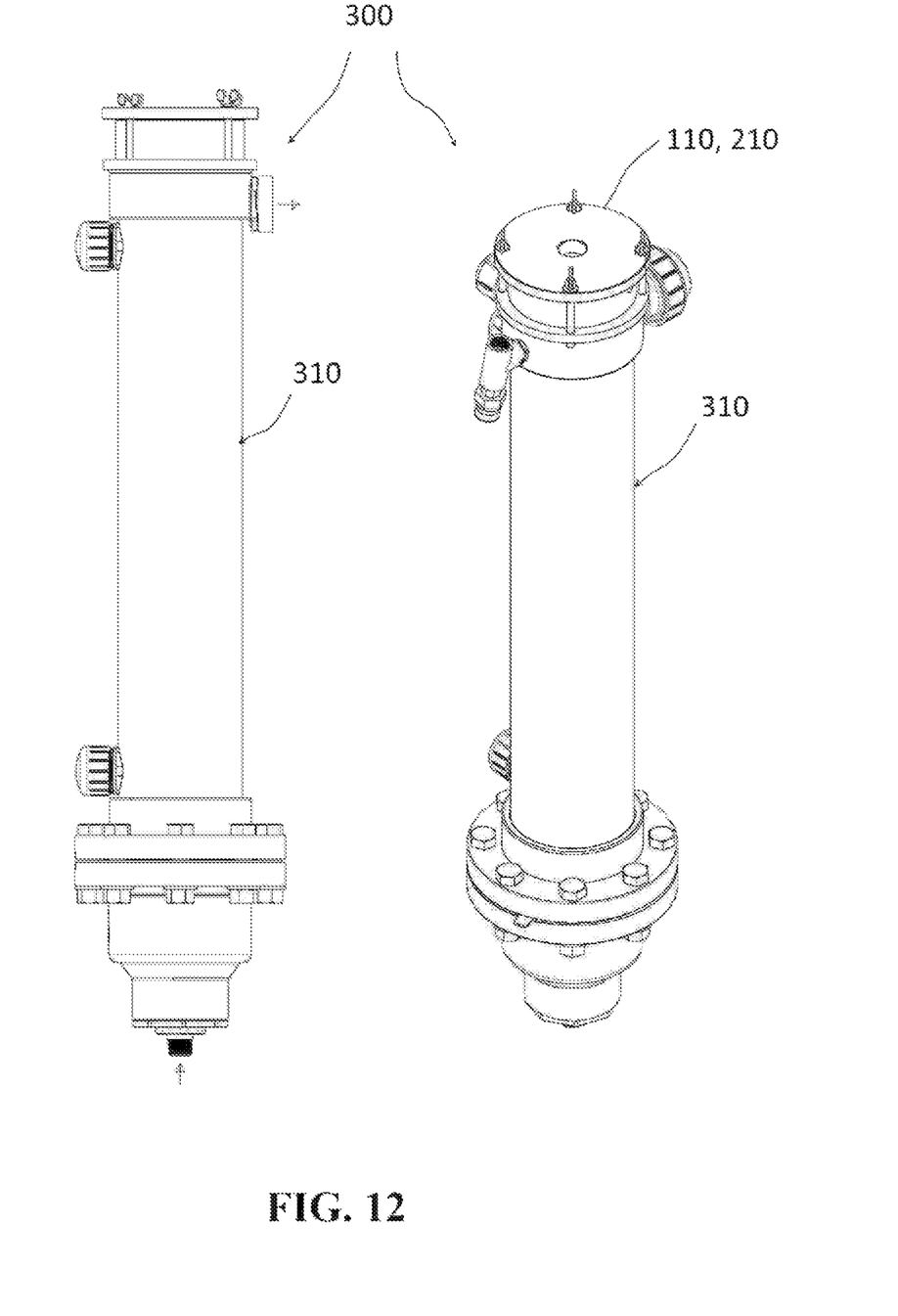
FIG. 12 illustrates an electrolytic unit according to a preferred embodiment of the invention.

The electrode cartridge 200 illustrated in FIGS. 9 and 11 further comprises three semi-tubular electrodes 230 of identical shape, operatively connected to a ring 210 and having a size greater than the electrodes of the first layer 160 so as to form a second electrode layer 260 surrounding the electrodes 130 of the first layer 160. The ring 210 and the cap 250 are configured to hold the electrodes 130, 230 in place with a second gap 240 between the first and second electrode layers 160, 260.

As illustrated in FIGS. 10 and 11, the electrodes of the first layer and/or the second layer are spaced apart relative to each other so as to form a space 180 between each electrode, and this to allow the circulation of the fluid to be treated.

The electrodes may be connected to a polarity inversion system to reversibly convert the central electrode to anode when the semi-tubular electrodes are converted to cathodes, or cathode when the semi-tubular electrodes are converted to anodes. Preferably, the polarity inversion system can be controlled automatically by computer.

Advantageously, the distance between the central electrode and the semi-tubular electrodes can be adjusted so as to maintain the gap constant when the electrodes are used and consumed.

The Applicant is also developing electrochemical reactors in which the total mass of the electrode cartridges can be greater than 70 kg.

This increase in magnesium mass will give the anode a fairly consistent lifetime and make it economically viable.

| | | |
|---|---|---|
| Anodic beam of nine anodes | 9 * 500 g | 4,500 g |
| Cylindrical or tubular anode | 1 * 10,000 g | 10,000 g |
| Semi-tubular anode | 3 * 3000 g | 9,000 g |
| Magnesium anode and cathode | 3 * 3000 g + 3 * 5000 g | 24 000 g. |

Comparative Table

| | Units | 6 anode beam | 9 anode beam | Cylindrical anode | Semi-Tubular Anode |
|---|---|---|---|---|---|
| Anodic Surface (AS) | cm² | 2,862 | 4,293 | 6,103 | 6,500 |
| Cathodic Surface (CS) | cm² | 5,680 | 5,680 | 5,680 | 5,680 |
| CS/AS | | 1.98 | 1.32 | 0.93 | 0.87 |
| Surface Loss | % | 68 | 68 | 0.4 | 0.4 |
| Mass | g | 2,700 | 4,050 | 10,000 | 9,000 |
| Efficiency | % (percent) | 63 | 71 | 100 | 99 |
| Theoretical Lifetime | h | 88 | 132 | 349 | 312 |

Figure 1:
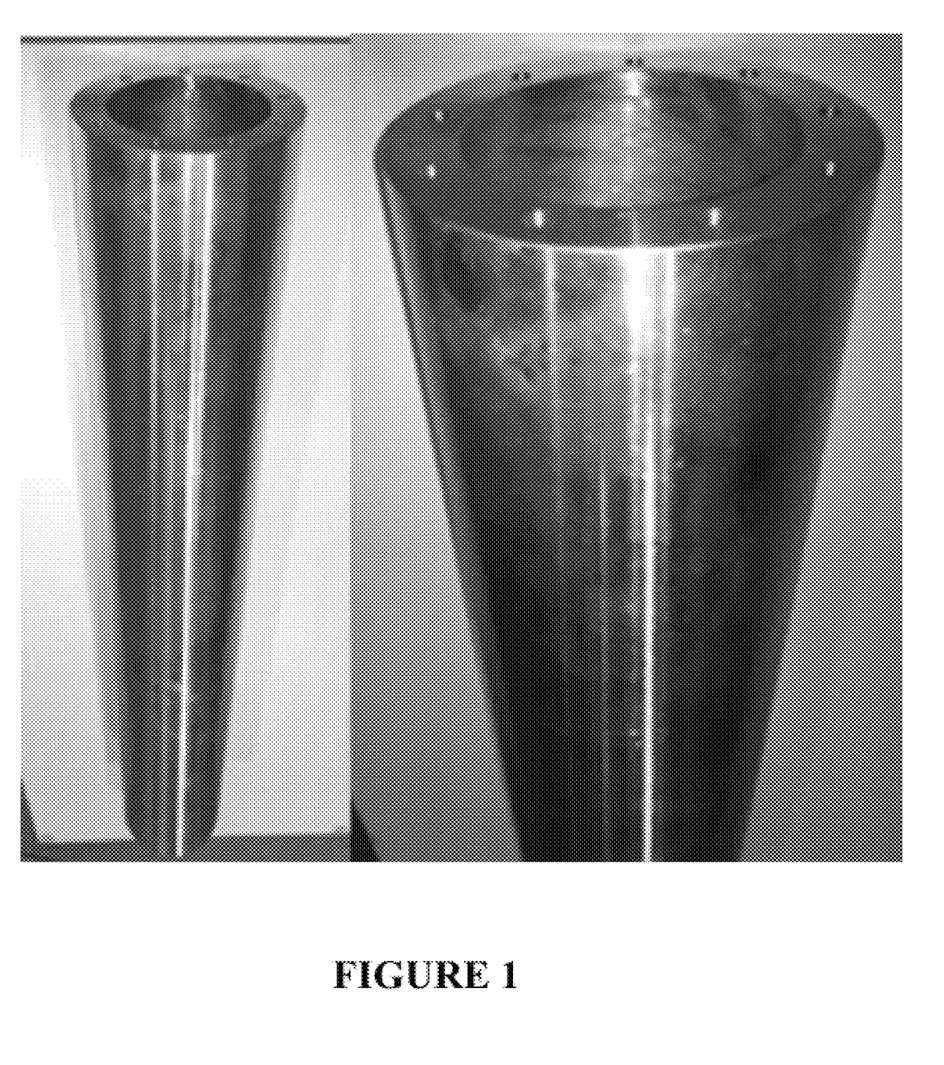
FIG. 1 is a photograph of a new magnesium anode according to a preferred embodiment of the invention.
Figure 2A:
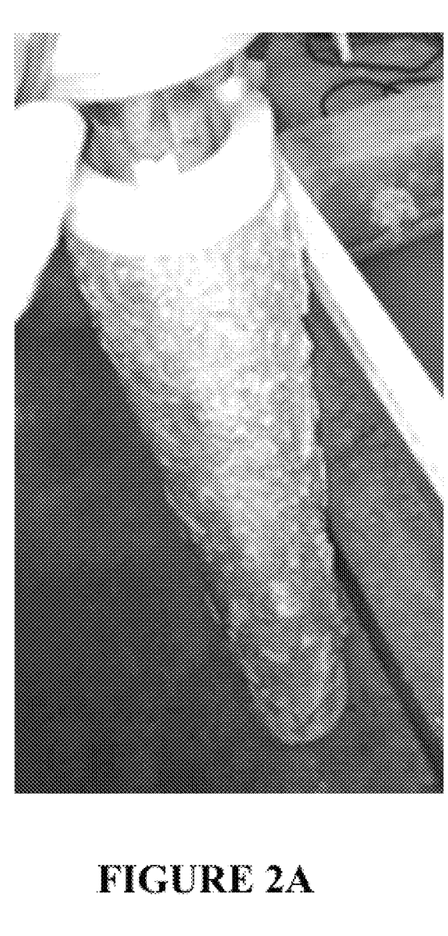
Figure 2B:
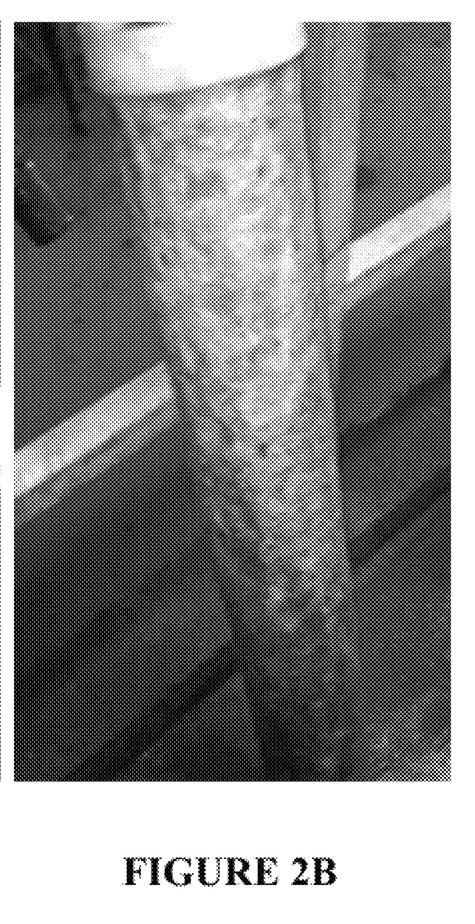
Figure 3A:
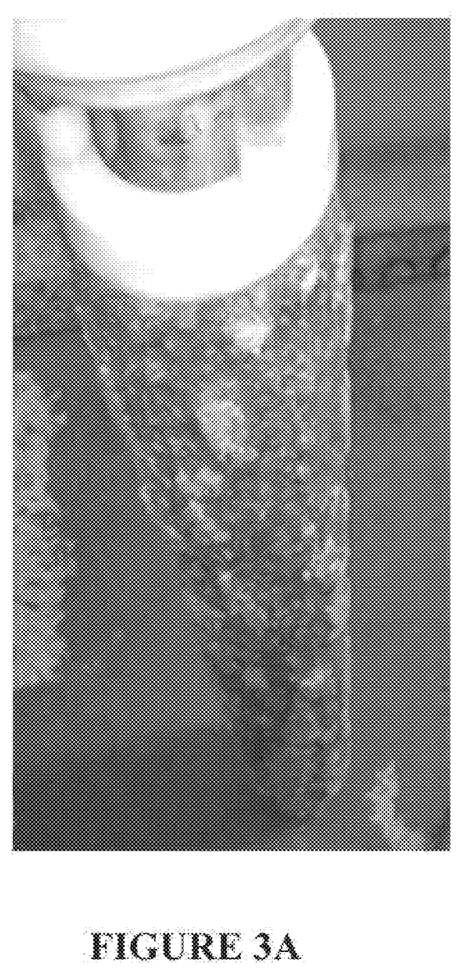
Figure 3B:
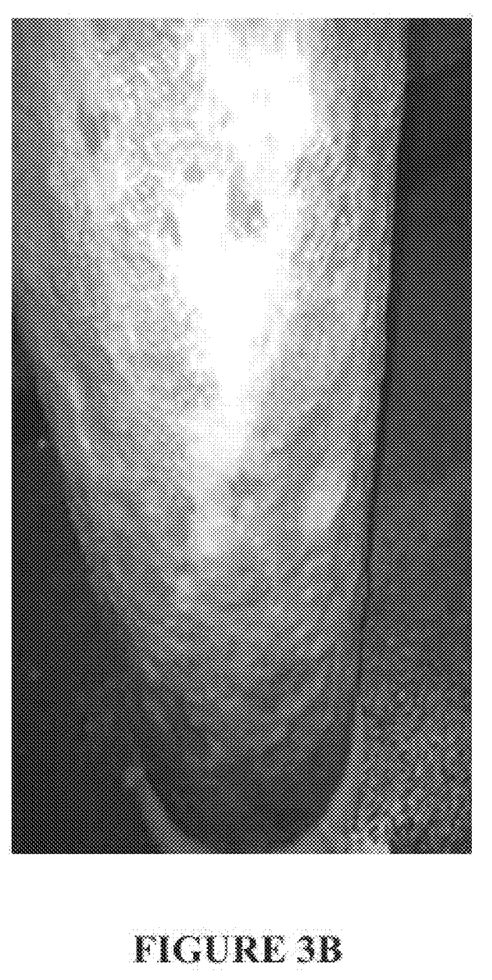
Figure 4A:
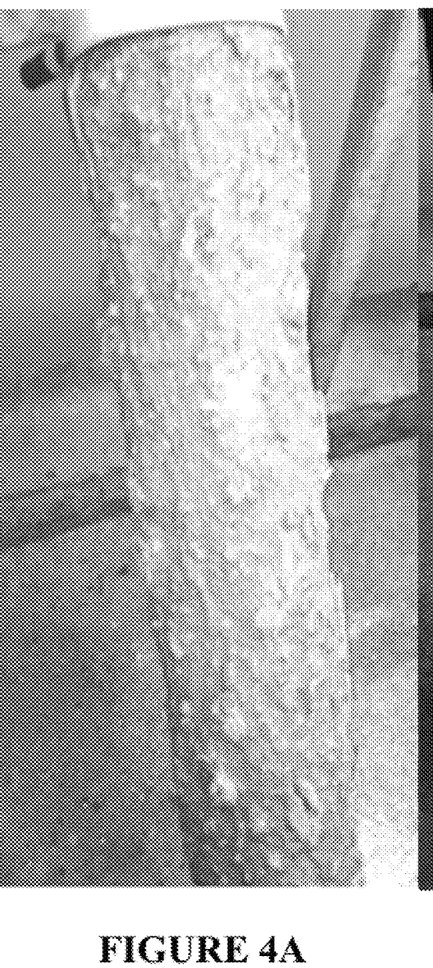
Figure 4B:
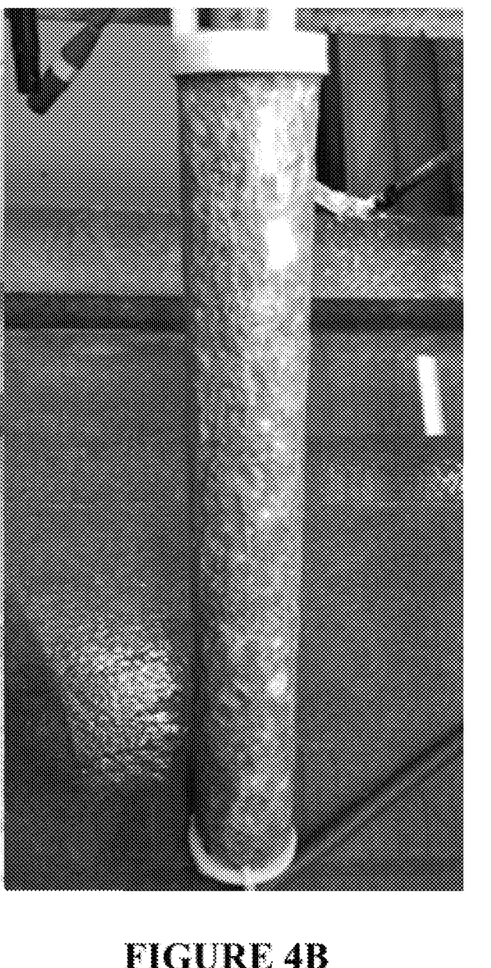
Figure 5A:
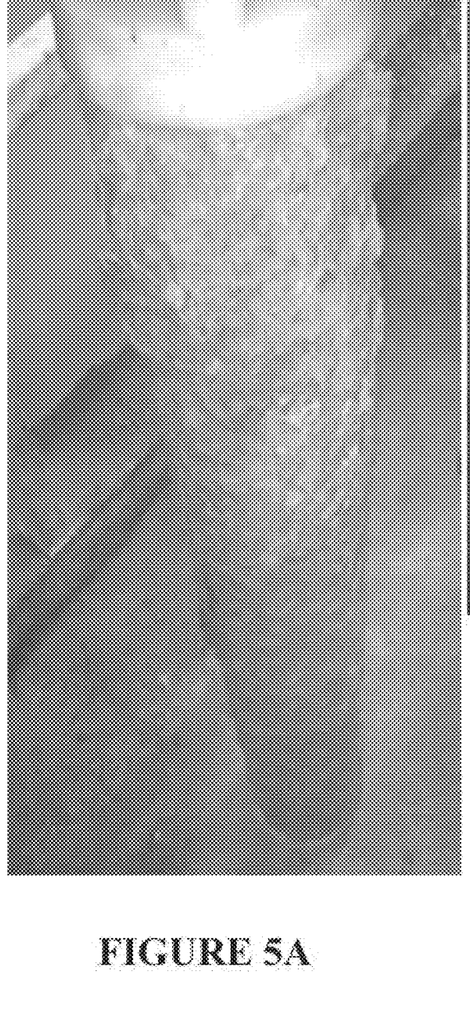
Figure 5B:
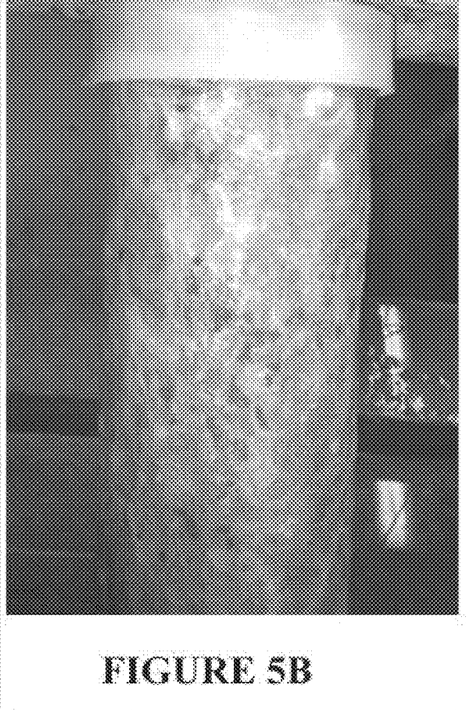
Figure 5C:
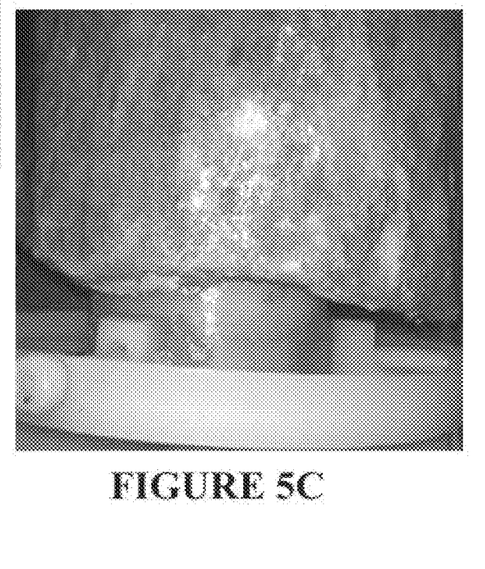
Figure 6A:
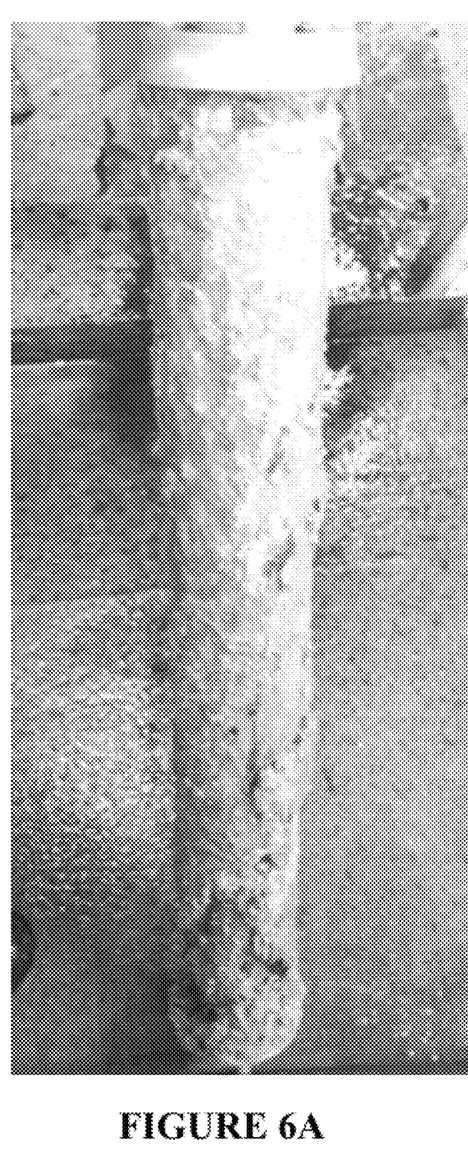
Figure 6B:
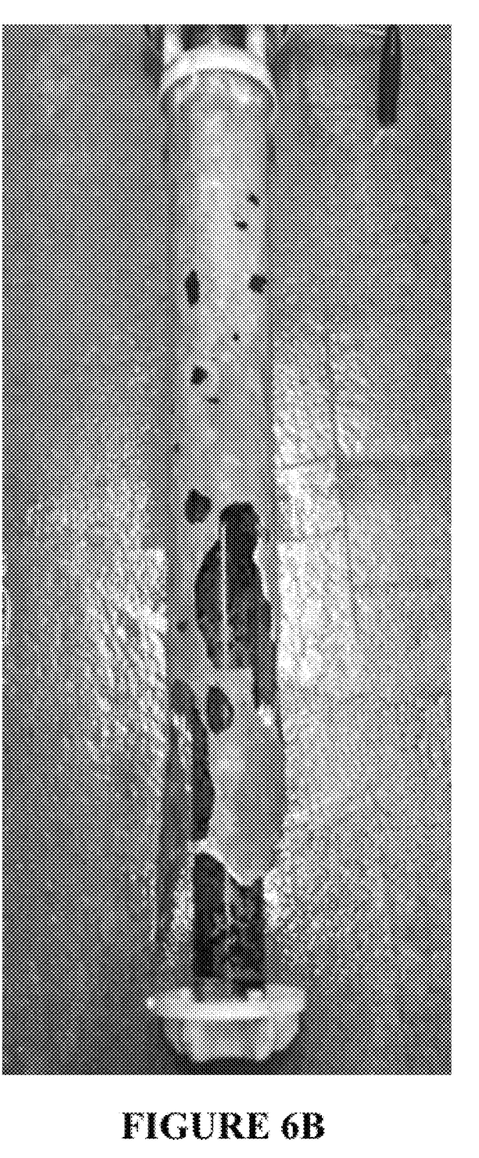

The cylindrical anode used, such as the one illustrated in FIG. 1, has an internal and external solid area evaluated at 6103 cm² distributed as follows: inner surface 2513 cm² and external surface 3590 cm² and is made of AZ31 magnesium alloy of chemical composition with a very high iron content (see Table 1). FIGS. 2-6 show the anode after different durations of use, before and after cleaning. FIG. 6B shows an anode worn at 87% with respect to the new anode shown in FIG. 1.

The analysis of the results:
Initial mass of the anode (g): 10,310
Final mass of the anode (g): 1,325
Remaining mass (%): 13
Mass consumed (g): 8,985
Mass consumed (%): 87
Effective operating time (h): 277.5
Continuous operating time (days): 11.6
Tests Duration (h): 312
Average hourly consumption (g/h): 32.5
Initial thickness of the wall (mm): 19
Final thickness (average) (mm): 3

During electrocoagulation tests, drops in current are observed. These drops are due to the passivation of the cylindrical anode, a permeable and friable layer is formed and tends to increase the strength of the medium. However, despite the presence of this layer, the flow rate of the effluent did not decrease and remained stable.

The presence of this layer required frequent cleaning, both outside the cylindrical anode and internally visibly obstructed. This layer, however, was not observed in a reactor mounted with a nine-anode beam according to the invention of chemical composition different from that of the cylindrical anode (AZ31). This difference in behavior is closely related to the chemical composition. It should be noted that with anodes according to the invention, the cleaning operations are reduced or avoided, and just the usual interventions of anode change and preventive maintenance are necessary.

In addition, the expected consumption is theoretically below the actual consumption of about 30%. This excess is probably due to chemical reactions that must be verified with laboratory tests. It should be noted that the theoretical consumption is of electrochemical nature whereas for real consumption, the contribution of the chemical diffusion is not negligible especially when it occurs in saline medium, where the chloride ion tends to accelerate this diffusion.

Since the difference in mass of Mg, due to chemical reactions, contributes to the abatement of pollutants, this loss is not considered as a loss but rather as a dosage that does not require an electric current, which implies a decrease in the electric power of treatment.

According to a preferred embodiment of the invention, the composition of the anode is:

3.93% Al;
0.91% Zn;
0.48% Mn;
0.0024% Fe;
0.010% Si;
0.0002 Sn;
Mg balance of about 94.67%.

The electrodes described here and made of the alloy according to the invention can be used in any type of electrochemical method or system, such as for example those described in Applicant's U.S. Pat. No. 9,194,049 B2 and the continuation application of this patent no. US 2016/0039687 A1, their contents being incorporated herein by reference.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A magnesium-based alloy for the manufacture of electrodes, the magnesium-based alloy having a composition comprising:
3.93% Al;
0.91% Zn;
0.48% Mn;
0.0024% Fe;
0.010% Si;
0.0002% Sn; and
a Mg balance of 94.6674% the % indicated being % by weight.

2. An electrode comprising a magnesium alloy as claimed in claim 1.

3. The electrode of claim 2, wherein the electrode is cylindrical, tubular or semi-tubular.

4. The electrode of claim 3 being an anode and constituting an anode beam consisting of a plurality of cylindrical, tubular and/or semi-tubular anodes.

5. The electrode of claim 4 comprising a metal core.

6. The electrode of claim 5, wherein the metal core comprises iron.

7. An electrode cartridge adapted to be inserted into an electrolytic reactor to form, once assembled, an electrocoagulation unit, the cartridge comprising:
a ring configured to be attached and close an end of the electrolytic reactor when the cartridge is inserted in said reactor;
a central electrode of tubular shape operatively connected to the center of the ring;
at least two electrodes of semi-tubular shape and operatively connected to the ring so as to surround the central electrode thereby defining a gap between the central electrode and the semi-tubular electrodes; and
a cover configured to attach to the other end of the center electrode and semi-tubular electrodes thereby maintaining the gap between the electrodes; and
wherein the electrodes comprise the magnesium-based alloy as claimed in claim 1.

8. The electrode cartridge according to claim 7, comprising three semi-tubular electrodes of identical shape surrounding the central electrode, the three electrodes forming a first layer of semi-tubular electrodes.

9. The electrode cartridge according to claim 8, further comprising three semi-tubular electrodes of identical shape, operatively connected to the ring and having a size greater than the electrodes of the first layer so as to form a second layer of electrodes surrounding the electrodes of the first layer, said ring and said cap being configured to hold the electrodes in place with a second gap between the first and second electrode layers.

10. The cartridge of claim 9, wherein the electrodes of the first layer and second layer are spaced apart from each other so as to form a gap between each electrode.

11. The electrode cartridge of claim 7, wherein the electrodes are connected to a polarity reversal system to reversibly convert the central electrode to anode when the semi-tubular electrodes are converted to cathodes, or in cathode when the semi-tubular electrodes are transformed into anodes.

12. The cartridge of claim 11, wherein the polarity inversion system is automatically controlled by a computer.

13. The electrode cartridge of claim 7, wherein a distance between the central electrode and the semi-tubular electrodes is adjustable so as to maintain the gap constant when the electrodes are used and consumed.

* * * * *